(12) United States Patent
Pang et al.

(10) Patent No.: US 9,503,715 B2
(45) Date of Patent: Nov. 22, 2016

(54) CONSTRAINED INTRA PREDICTION IN VIDEO CODING

(71) Applicant: QUALCOMM Incorporated, San Diego, CA (US)

(72) Inventors: Chao Pang, San Diego, CA (US); Jianle Chen, San Diego, CA (US); Joel Sole Rojals, La Jolla, CA (US); Rajan Laxman Joshi, San Diego, CA (US); Liwei Guo, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 14/472,134

(22) Filed: Aug. 28, 2014

(65) Prior Publication Data

US 2015/0063440 A1    Mar. 5, 2015

Related U.S. Application Data

(60) Provisional application No. 61/872,416, filed on Aug. 30, 2013.

(51) Int. Cl.
| | | |
|---|---|---|
| *H04N 19/00* | (2014.01) | |
| *H04N 19/174* | (2014.01) | |
| *H04N 19/159* | (2014.01) | |
| *H04N 19/176* | (2014.01) | |
| *H04N 19/593* | (2014.01) | |
| *H04N 19/105* | (2014.01) | |
| *H04N 19/61* | (2014.01) | |

(52) U.S. Cl.
CPC ...... *H04N 19/00024* (2013.01); *H04N 19/105* (2014.11); *H04N 19/159* (2014.11); *H04N 19/174* (2014.11); *H04N 19/176* (2014.11); *H04N 19/593* (2014.11); *H04N 19/61* (2014.11)

(58) Field of Classification Search
None
See application file for complete search history.

(56) References Cited

PUBLICATIONS

Lainema et al., "Intra Coding of the HEVC Standard", IEEE Trans. on Circuits and Systems for Video Technology, vol. 22, No. 12, Dec. 2012, pp. 1792-1801.*
Wahadaniah et al., "Constrained Intra Prediction Scheme for Flexible-Sized Prediction Units in HEVC", JCT-VC Meeting, Jan. 20-28, 2011, Document JCTVC-D094, pp. 1-8.*

(Continued)

*Primary Examiner* — Reza Aghevli
(74) *Attorney, Agent, or Firm* — Shumaker & Sieffert, P.A.

(57) ABSTRACT

A method of encoding video data includes determining that a current block of video data is to be encoded using an intra block copy (BC) mode and constrained intra prediction, determining one or more reference blocks that may be used for encoding the current block using the intra BC mode, wherein each of the one or more reference blocks is encoded with an intra prediction mode, and encoding the current block of video data using the intra BC mode and at least one of the determined one or more reference blocks.

6 Claims, 8 Drawing Sheets

ILLUSTRATION OF INTRA BC

(56) References Cited

PUBLICATIONS

Sullivan et al., "Overview of the High Efficiency Video Coding (HEVC) Standard", IEEE Trans. on Circuits and Systems for Video Technology, vol. 22, No. 12, Dec. 2012, pp. 1649-1668.*
Belle, "Extended Texture Prediction for H.264 Intra Coding", VCEG Meeting, Jan. 15-16, 2007, Document VCEG-AE11, pp. 1-7.*
Budagavi et al., "AHG8: Video Coding using Intra Motion Compensation", JCT-VC Meeting, Apr. 18-26, Document JCTVC-M0350, pp. 1-5.*
Lainema et al., "Angular Intra Prediction in High Efficiency Video Coding (HEVC)", IEEE Int'l Workshop on Multimedia Signal Processing, Oct. 17-19, 2011, pp. 1-5.*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Balle, et al., "Extended Texture Prediction for H.264/AVC Intra Coding", VCEG Meeting; MPEG Meeting; Jan. 15, 2007-Jan. 16, 2007; MARRAKECH; (Video Coding Experts Group of ITU-T SG.16), No. VCEG-AE11, XP030003514, 7 pp.
Budagavi, et al., "AHG8: Video Coding Using Intra Motion Compensation", MPEG Meeting; Apr. 18-26, 2013, Incheon, (Motion Picture Expert Group or ISO/IEC JTC1/SC29/WG11), No. m28818, XP030057351, 5 pp.
Flynn, et al., "HEVC Range Extensions Draft 3," JCT-VC meeting; MPEG meeting; Document: JCTVC-M1005)_v1; Apr. 18-26, 2013; Incheon; (Joint Collaborative Team on Video Coding of ISO/IEC JTC1/SC29/WG11 and ITU-T SG.16 ); URL: http://wftp3.itu.int/av-arch/jctvc-site/, XP030114428, 315 pp.
Pang, et al., "Non-RCE3: Intra Motion Compensation with 2-D MVs", JCT-VC Meeting; Jul. 25-Aug. 2, 2013; Vienna; (Joint Collaborative Team on Video Coding of ISO/IEC JTC1/SC29/WG11 and ITU-TSG . 16) ; URL : http://wftp3.itu.int/av-arch/jctvc-site/, No. JCTVC-N0256-v4, XP030114777, 12 pp.
Wahadaniah, "Constrained Intra Prediction Scheme for Flexible-Sized Prediction Units in HEVC", JCT-VC Meeting; MPEG Meeting; Jan. 20-28, 2011, Daegu; (Joint Collaborative Team on Video Coding of ISO/IEC JTC1/SC29/WG11AND ITU-T SG.16), No. JCTVC-D094, XP030008134, 8 pp.
Flynn et al., "High Efficiency Video Coding (HEVC) Range Extensions Text Specification: Draft 4", Joint Collaborative Team on Video Coding (JCT-VC) of ITU-T SG 16 WP 3 and ISO/IEC JTC 1/SC 29/WG 11, Doc. JCTVC-N1005_v1, 13th Meeting: Incheon, KR, Apr. 18-26, 2013, 332 pp.
Bross et al., "Editors' Proposed Corrections to HEVC version 1 ,"Joint Collaborative Team on Video Coding (JCT-VC) of ITU-T SG16 WP3 and ISO/IEC JTC1/SC29/WG11, 13th Meeting, Incheon, KR, Apr. 2013, which a Sep. 30, 2013, is available from http://phenix.int-evry.fr/jct/doc_end_user/documents/13_1ncheon/wg11/JCTVCM0432-v3.zip, 310 pp. [uploaded in parts: part 1, 150 pp.; part 2, 160 pp.].
Tech, et al., "MV-HEVC Draft Text 3 (ISO/IEC 23008-2:201x/PDAM2)", Joint Collaborative Team on 3D Video Coding Extension Development of ITU-T SG 16 WP 3 and ISO/IEC JTC 1/SC 29/WG 11, 3rd Meeting: Geneva, Ch, JCT3V-C1004_d3, Jan. 17-23, 2013; 34 pp.
Chen, et al., "SHVC Working Draft 2", JCT-VC Meeting; MPEG Meeting, Apr. 18-26, 2013; Incheon, (Joint Collaborative Team on Video Coding of ISO/IEC JTC1/SC29/WG11 and ITU-T SG.16 ), URL: http://wftp3.itu.int/av-arch/jctvc-site/, No. JCTVC-M1008, XP030114430, 51 pp.
International Search Report and Written Opinion from International Application No. PCT/US2014/053497, dated Nov. 24, 2014, 12 pp.
Response to Written Opinion dated Nov. 24, 2014, from International Application No. PCT/US2014/053497, filed on Jun. 30, 2015, 6 pp.
Second Written Opinion from International Application No. PCT/US2014/053497, dated Sep. 7, 2015, 9 pp.
Response to Second Written Opinion dated Sep. 7, 2015, from International Application No. PCT/US2014/053497, filed on Oct. 21, 2015, 15 pp.
International Preliminary Report on Patentability from International Application No. PCT/US2014/053497, dated Dec. 21, 2015, 9 pp.

\* cited by examiner

ILLUSTRATION OF INTRA BC

CONSTRAINED INTRA PREDICTION IN VIDEO CODING

This application claims the benefit of U.S. Provisional Patent Application No. 61/872,416, filed Aug. 30, 2013, the entirety of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra picture) prediction and/or temporal (inter picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra coded (I) slice of a picture are encoded using spatial prediction with respect to reference samples in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter coded block is encoded according to a motion vector that points to a block of reference samples forming the predictive block, and the residual data indicating the difference between the coded block and the predictive block. An intra coded block is encoded according to an intra coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for constrained intra prediction. In particular, this disclosure describes various techniques for implementing constrained intra prediction in conjunction with intra Block Copy (BC) techniques.

In one example of the disclosure, a method of encoding video data comprises determining that a current block of video data is to be encoded using an intra block copy (BC) mode and constrained intra prediction, determining one or more reference blocks that may be used for encoding the current block using the intra BC mode, wherein each of the one or more reference blocks is encoded with an intra prediction mode, and encoding the current block of video data using the intra BC mode and at least one of the determined one or more reference blocks.

In another example of the disclosure, an apparatus configured to encode video data comprises a video memory configured to store information related to a current block and one or more reference blocks, and a video encoder configured to determine that the current block of video data is to be encoded using an intra block copy (BC) mode and constrained intra prediction, determine the one or more reference blocks that may be used for encoding the current block using the intra BC mode, wherein each of the one or more reference blocks is encoded with an intra prediction mode, and encode the current block of video data using the intra BC mode and at least one of the determined one or more reference blocks.

In another example of the disclosure, an apparatus configured to encode video data comprises means for determining that a current block of video data is to be encoded using an intra block copy (BC) mode and constrained intra prediction, means for determining one or more reference blocks that may be used for encoding the current block using the intra BC mode, wherein each of the one or more reference blocks is encoded with an intra prediction mode, and means for encoding the current block of video data using the intra BC mode and at least one of the determined one or more reference blocks.

In another example, this disclosure describes a computer-readable storage medium storing instructions that, when executed, cause one or more processors of a device configured to encode video data to determine that the current block of video data is to be encoded using an intra block copy (BC) mode and constrained intra prediction, determine the one or more reference blocks that may be used for encoding the current block using the intra BC mode, wherein each of the one or more reference blocks is encoded with an intra prediction mode, and encode the current block of video data using the intra BC mode and at least one of the determined one or more reference blocks.

The details of one or more examples are set forth in the accompanying drawings and the description below. Other features, objects, and advantages will be apparent from the description and drawings, and from the claims.

DETAILED DESCRIPTION

This disclosure proposes various methods, techniques, and apparatuses for performing constrained intra prediction together with an intra Block Copy (BC) intra prediction process for video encoding and video decoding.

Figure 1:
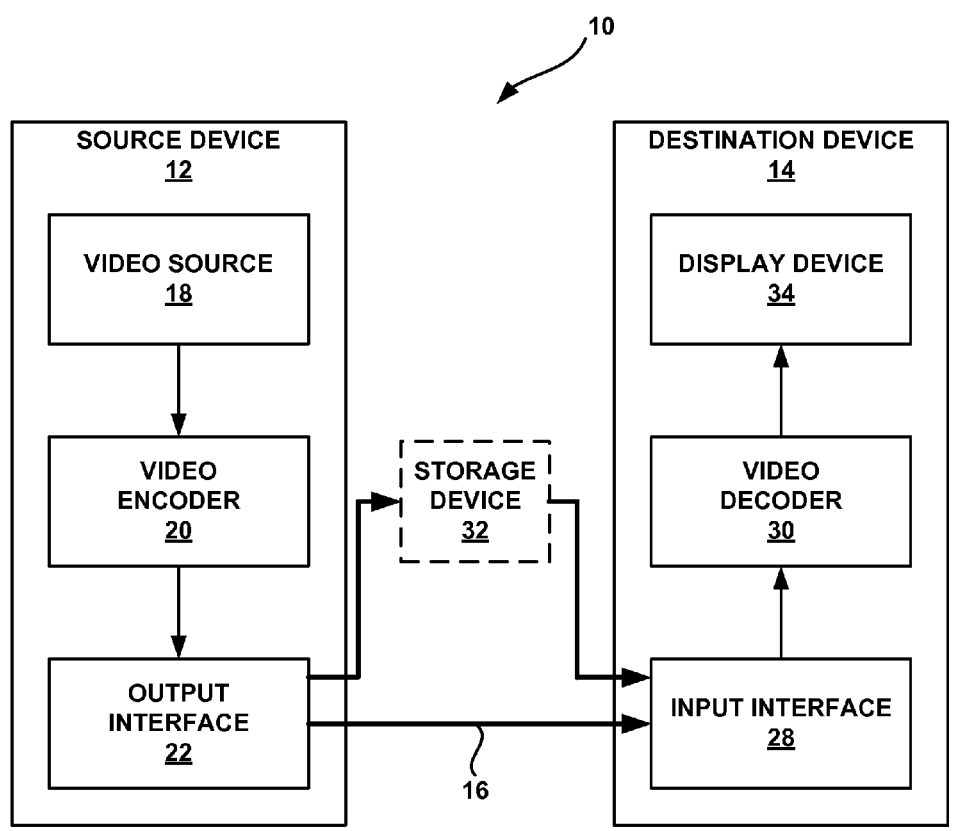
FIG. 1 is a block diagram illustrating an example video encoding and decoding system that may utilize the techniques described in this disclosure.

FIG. 1 is a block diagram illustrating an example video encoding and decoding system 10 that may utilize the techniques for constrained intra prediction described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure for constrained intra prediction are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 34. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 34 may be integrated with, or external to, destination device 14. In some examples, destination device 14 may include an integrated display device and also be configured to interface with an external display device. In other examples, destination device 14 may be a display device. In general, display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC has developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra prediction encoding modes, the HM may provide as many as thirty-three intra prediction encoding modes.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Aug. 30, 2013, is downloadable from: http://phenix.int-evry.fr/jct/doc_end_user/documents/12_Geneva/wg11/JCTVC-L1003-v34.zip.

Another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of Aug. 30, 2013, is available from: http://phenix.int-evry.fr/jct/doc_end_user/documents/13_Incheon/wg11/JCTVC-M0432-v3.zip.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra prediction mode encoded, or inter prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra mode encoded, the PU may include data describing an intra prediction mode for the PU. As another example, when the PU is inter mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra prediction in PU sizes of 2N×2N or N×N, and inter prediction in symmetric PU sizes of 2N×2N, 2N×N, N×2N, or N×N. The HM also supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra predictive or inter predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Proposals for Intra Block Copying (BC) techniques were recently adopted for inclusion in the (HEVC) Range Extensions standard. A draft of the HEVC Range Extensions is described in D. Flynn, J. Sole, and T. Suzuki, "High Efficiency Video Coding (HEVC) Range Extensions text specification: Draft 4," Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, JCTVC-N1005_v3 (hereinafter, "HEVC Range Extension"). HEVC Range extension is available for download at http://phenix.int-evry.fr/jct/doc_end_user/documents/14_Vienna/wg11/JCTVC-N1005-v3.zip.

Intra BC is a dedicated technique which enables removing a certain kind of spatial redundancy and improving intra frame coding efficiency. More details concerning intra BC techniques can be found in C. Pang, et al., "Non-RCE3 Intra Motion Compensation with 2-D MVs," Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, (hereinafter, "JCTVC-N0256"). JCTVC-N0256 is available for download at http://phenix.int-evry.fr/jct/doc_end_user/documents/14_Vienna/wg11/JCTVC-N0256-v4.zip.

The techniques of this disclosure are related to techniques for constrained intra prediction in conjunction with intra BC techniques. However, the techniques of this disclosure are not limited to HEVC standard, and may be applicable in any video coding system in which constrained intra prediction and intra BC, or their analogues, are used.

Many applications, such as remote desktop, remote gaming, wireless displays, automotive infotainment, cloud computing, etc., are becoming routine in daily use. Video content in these applications may consist of combinations of natural content, text, artificial graphics, etc. In text and artificial graphics regions, repeated patterns (such as characters, icons, symbols, etc.) often exist. Intra BC is a dedicated technique which enables removing the redundancy in coding text and artificial graphics, and improves intra frame coding efficiency, as described in JCTVC-N0256

Figure 2:
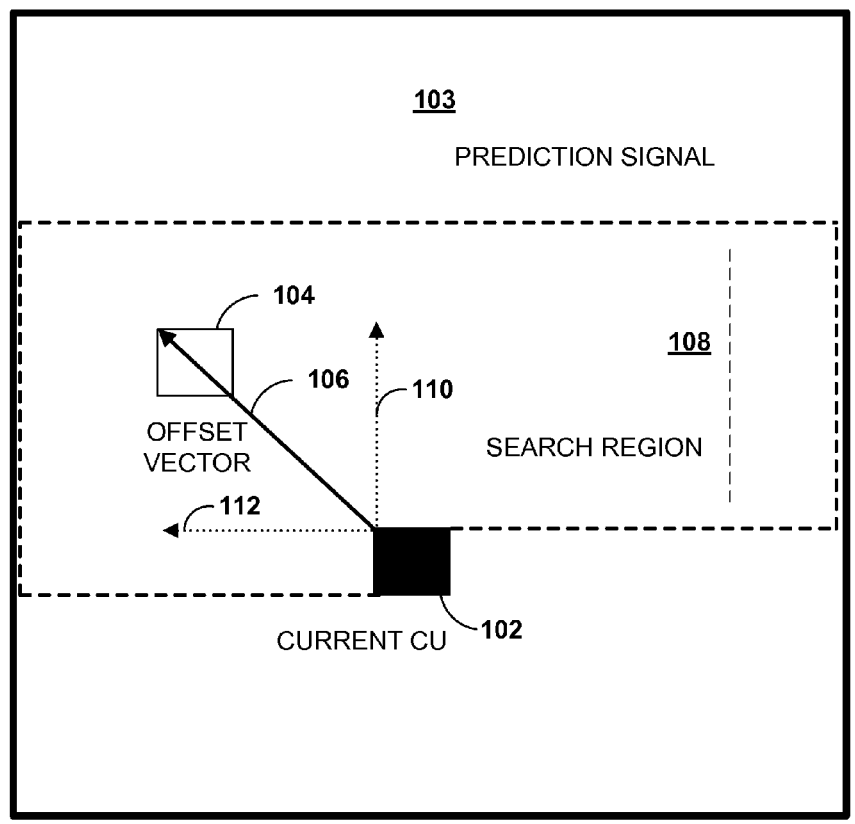
FIG. 2 is a conceptual diagram illustrating example intra BC techniques.

FIG. 2 is a conceptual diagram illustrating an example technique for predicting a current block of video data 102 within a current picture 103 according to an intra BC mode. FIG. 2 illustrates a predictive block of video data 104 within current picture 103. A video coder, e.g., video encoder 20 and/or video decoder 30, may use predictive video block 104 to predict current video block 102 according to an intra BC mode in accordance with the techniques of this disclosure.

Video encoder 20 determines a predictive video block 104 for predicting current video block 102 from a set of previously reconstructed blocks of video data. Video encoder 20 reconstructs blocks of video data by inverse quantizing and inverse transforming the video data that is also included in the encoded video bitstream, and summing the resulting residual blocks with the predictive blocks used to predict the reconstructed blocks of video data.

In the example of FIG. 2, intended region 108 within picture 103, which may also be referred to as an "intended area" or "raster area," includes a set of previously reconstructed video blocks. Video encoder 20 may determine predictive video block 104 to predict current video block 102 from among the video blocks in intended region 108 based on an analysis of the relative efficiency and accuracy of predicting and coding current video block 102 based on various video blocks within intended region 108.

Video encoder 20 determines two-dimensional vector 106 (also called a block vector) representing the location or displacement of predictive video block 104 relative to current video block 102. Two-dimensional motion vector 106 includes horizontal displacement component 112 and vertical displacement component 110, which respectively represent the horizontal and vertical displacement of predictive video block 104 relative to current video block 102. Video encoder 20 may include one or more syntax elements that identify or define two-dimensional motion vector 106, e.g., that define horizontal displacement component 112 and vertical displacement component 110, in the encoded video bitstream. Video decoder 30 may decode the one or more syntax elements to determine two-dimensional motion vector 106, and use the determined vector to identify predictive video block 104 for current video block 102.

Current video block 102 may be a CU, or a PU of a CU. In some examples, a video coder, e.g., video encoder 20 and/or video decoder 30, may split a CU that is predicted according to intra BC into a number of PUs. In such examples, the video coder may determine a respective (e.g., different) two-dimensional vector 106 for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

Constrained intra prediction is an error-resilience feature in HEVC. Constrained intra prediction is an intra prediction technique whereby video encoder 20 limits the use of neighboring blocks as reference blocks in the intra prediction process. In some examples, when using constrained intra prediction, video encoder 20 may be configured to not use (i.e., exclude using) neighboring blocks as reference blocks if the neighboring blocks were coded using inter prediction. By not using inter predicted blocks as reference blocks for intra prediction, video encoder 20 may create an encoded video bitstream that is more error resilient. This is because inter predicted blocks are more prone to error, as decoding inter predicted blocks relies on information from previous frames, which may be lost during transmission. By not using inter predicted blocks as reference blocks, constrained intra prediction techniques avoid and/or limit the situations where potentially corrupted prior decoded picture data propagates errors into the prediction signal for intra predicted blocks.

In prior examples of constrained intra prediction (e.g., in the MPEG-4 video coding standard), only neighboring blocks coded with intra DC prediction mode are allowed to be used as a reference block for other intra predicted blocks. In other examples (e.g., in H.265/AVC and HEVC video coding standards), other intra prediction modes (e.g., intra Angular, intra Planar, and intra DC) are allowed to be encoded using constrained intra prediction. In the H.265/AVC and HEVC examples, when reference samples are determined to be unavailable as reference samples in constrained intra prediction (e.g., when such samples are in an inter predicted block), available reference sample values from other neighboring blocks (e.g., from blocks coded in intra Angular, intra Planar, or intra DC mode) are substituted.

Three general intra prediction modes were initially supported in HEVC: intra Angular, intra Planar, and intra DC. In HEVC, there are 33 intra Angular modes. In intra Angular prediction, depending on the angle of the particular prediction mode that is used, arrays of neighboring reference samples are filtered and the filtered samples are used in the intra prediction process. In intra DC mode, a single reference sample of the neighboring reference samples is used in the intra prediction process. In intra Planar mode, a smooth gradient filter is applied to the neighboring reference samples before being used in the intra prediction process.

Intra BC mode has been adopted into the HEVC Range Extensions, and as such, one additional intra prediction mode is supported in HEVC. With the adoption of intra BC mode, problems arise involving the existing constrained intra prediction scheme. For example, as intra BC is treated as an intra prediction technique, the neighboring reference samples inside any blocks coded with intra BC mode are considered available when constrained intra prediction is enabled. That is, intra BC blocks may be used as reference samples for other intra predicted blocks, even when using constrained intra prediction. However, the prediction samples for the blocks coded with intra BC mode may be from blocks coded with inter prediction mode. Thus, the blocks coded with an intra prediction mode may not be correctly reconstructed when constrained intra prediction is enabled (i.e., error may propagate through intra BC coded blocks). Furthermore, no process has been established to define what blocks may be used as reference samples when constrained Intra prediction is used when coding a block using intra BC mode.

In view of these drawbacks, this disclosure proposes techniques to more efficiently perform intra BC coding in conjunction with constrained intra prediction. In one example of the disclosure, video encoder 20 is configured to conform the encoded video bitstream such that, when constrained intra prediction is enabled, only samples inside neighboring blocks (or within a search region for intra BC mode) coded with an intra prediction mode (e.g., intra Angular, intra DC, intra Planar, and intra BC mode) can be used as reference samples for blocks encoded with intra BC mode. Video encoder 20 may be configured to exclude any blocks coded with an inter prediction mode from being used as a reference block for encoding a block using Intra BC mode.

Figure 3:
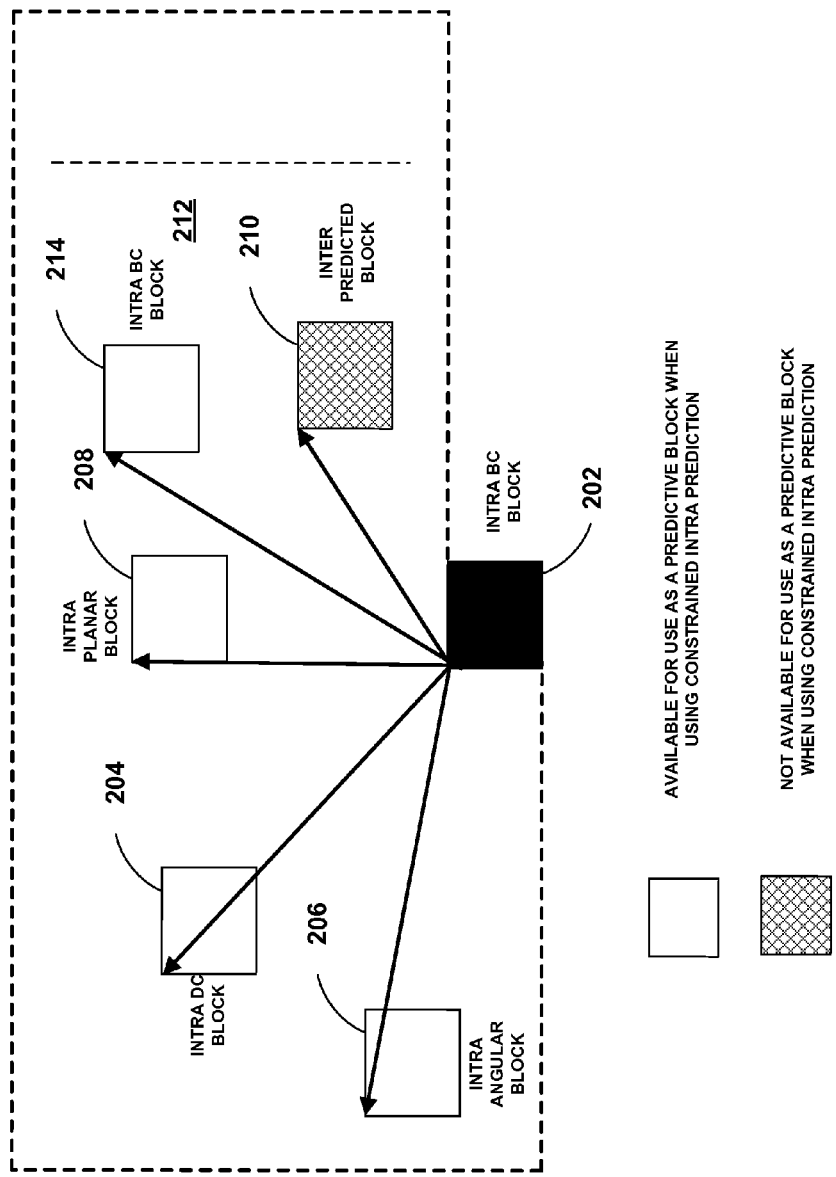
FIG. 3 is a conceptual diagram illustrating available reference blocks for intra BC when using constrained intra prediction according to an example technique of this disclosure.

FIG. 3 is a conceptual diagram illustrating available reference blocks for intra BC when using constrained intra prediction according to an example technique of this disclosure. As shown in FIG. 3, current block 202 is to be coded using intra BC mode and constrained intra prediction. Video encoder 20 may search for a predictive block in search area 212. Potential predictive blocks include block 206 coded with intra Angular mode, block 204 coded with intra DC mode, block 208 coded with intra Planar mode, block 214 coded with intra BC mode, and block 210 coded with an inter prediction mode. In accordance with an example technique of this disclosure, when constrained intra prediction is enabled, video encoder 20 is configured to use any block coded with one of intra Angular, intra Planar, intra DC, or intra BC mode (e.g., blocks 204, 206, 208, and 214 in FIG. 3) as a predictive block for coding a current block (e.g., block 202) with intra BC mode. Video encoder 20, when constrained intra prediction is enabled, would not use (e.g., exclude) any blocks coded using inter prediction (e.g., block 210) as a predictive block when coding the current block using intra BC. As shown in FIG. 3, inter predicted block 210 (shown with a hashed fill) is an example of a block that is excluded from being used as a predictive block for current block 202 that is coded using intra BC mode.

In one example of the disclosure, video encoder 20 may employ the above-described limitation of using inter predicted blocks as predictive block for intra BC blocks for all slice types (e.g., I, P, and B slices). An I slice is a slice where all the blocks in the slice are coded using an intra prediction mode. A P slice is a slice that may include blocks coded with both intra prediction techniques and blocks coded with uni-directional inter prediction techniques. A B slice is a slice that may include blocks coded with intra prediction techniques, blocks coded with uni-directional inter prediction techniques, and blocks coded with bi-directional inter prediction techniques.

For I/P/B slices, when constrained intra prediction is enabled, the neighboring reference samples inside the block coded using any of the four aforementioned intra prediction modes (i.e., intra Angular, intra Planar, intra BC, and intra DC) are considered to be available for intra prediction of the current block. In other words, when constrained intra prediction is enabled, the blocks using any of the four intra prediction modes can be independently decoded without decoding a block coded with an inter prediction mode. In order to decode the block of intra BC mode without reconstructing inter prediction blocks, the samples in the inter prediction are not used as predictors for the block coded with intra BC mode. Therefore, in the conformant bitstream, when constrained intra prediction is enabled, video encoder 20 is configured to not use any sample from an inter predicted block to predict a block coded with intra BC mode.

In summary, according to a first example of the disclosure, video encoder 20 may be configured to determine that a current block of video data (e.g., block 202 in FIG. 3) is to be encoded using an intra BC mode and constrained intra prediction, determine one or more reference blocks that may be used for encoding the current block using the intra BC mode, wherein each of the one or more reference blocks is encoded with an intra prediction mode, and encode the current block of video data using the intra BC mode and at least one of the determined one or more reference blocks. As discussed above, in one example of the disclosure, blocks coded with one or more of the intra BC mode, the intra Angular mode, the intra Planar mode, or the intra DC mode may be used as predictive blocks when encoding an intra BC block with constrained intra prediction. Further in this regard, video encoder 20 may be configured to exclude blocks of video data encoded using an inter prediction mode from the one or more reference blocks available for use as predictive blocks for a block encoded using intra BC mode.

In another example of the disclosure, when constrained intra prediction is enabled, intra BC mode is disabled in P/B slices. That is, both video encoder 20 and video decoder 30 are configured to not code (i.e., not encode or decode) any blocks in a P/B slice using intra BC mode. However, even when constrained intra prediction is enabled, video encoder 20 and/or video decoder 30 may still be configured to code a block using intra BC mode when such block is in an I slice.

For an I slice, when constrained intra prediction is enabled, video encoder 20 may be configured to use neighboring reference samples inside a block coded with an intra prediction mode (e.g., any of intra BC, intra DC, intra Angular, and Intra Planar modes). In a particular example of the disclosure, all the four intra prediction modes supported by HEVC (i.e., intra Angular, intra Planar, intra DC, and intra BC) are supported (i.e., allowed to be used) in I slices when constrained intra prediction is enabled.

For P/B slices, when constrained intra prediction is enabled, only the three original HEVC intra prediction modes (i.e., intra Angular, intra Planar, and intra DC) are supported (i.e., allowed to be used) for both coding and use as a predictive block. No blocks in a P/B slice may be encoded using intra BC prediction mode when constrained intra prediction is enabled.

In one example, when constrained intra prediction is enabled, video encoder 20 is configured to not signal intra_bc_flag for CUs in P/B slice and is inferred to be equal to 0 (i.e., intra BC mode is disabled). This is because intra BC is disallowed in a P/B slice when constrained intra prediction is enabled. The intra_bc flag with a value of 1 indicates that a block (e.g., CU) is coded with intra BC mode.

In a further example, this disclosure proposes that video encoder 20 be configured to signal a flag (e.g., named a slice_intraBC_enable_flag) in a slice header to indicate whether intra BC mode is enabled for the current slice. Video encoder 20 may be further configured to signal the slice_intraBC_enable_flag at other syntax locations, such as the picture parameter set (PPS), and/or sequence parameter set (SPS).

In one example, video encoder 20 may be configured to signal the slice_intraBC_enable_flag in the slice header, only when an SPS level intraBC_enable_flag is equal to 1 (i.e., intra BC is enabled for pictures corresponding to the SPS); otherwise. the slice_intraBC_enable_flag is inferred to be equal to 0 (i.e., intra BC mode is disabled for the slice). This disclosure also proposes that video encoder 20 be configured to generate a conforming bitstream constraint that includes, when constrained intra prediction is enabled, disabling and/or not using intra BC mode to encode any blocks in a P/B slice (e.g., as indicated by a slice_intraBC_enable_flag equal to 0 for the P/B slice).

In another example of the disclosure, when constrained intra prediction is enabled, video encoder 20 and/or video decoder 30 may be configured to not use any neighboring reference samples (e.g., mark such reference samples as unavailable) inside any blocks coded with intra BC mode in P/B slices. In this example, the intra prediction modes that apply to constrained intra prediction include intra Angular mode, intra DC mode, and intra Planar mode, and exclude intra BC mode in P/B slices.

In a second example of the disclosure, when constrained intra prediction is enabled, four intra prediction modes (i.e., intra Angular, intra Planar, intra DC, and intra BC) are supported (i.e., allowed to be used) for all kinds of slices. That is, video encoder 20 and/or video decoder 30 may be configured to code blocks with any of the four types of intra prediction modes, regardless of slice type. However, the conditions of neighboring reference sample availability for constrained intra prediction are different for I slices and P/B slices.

Figure 4:
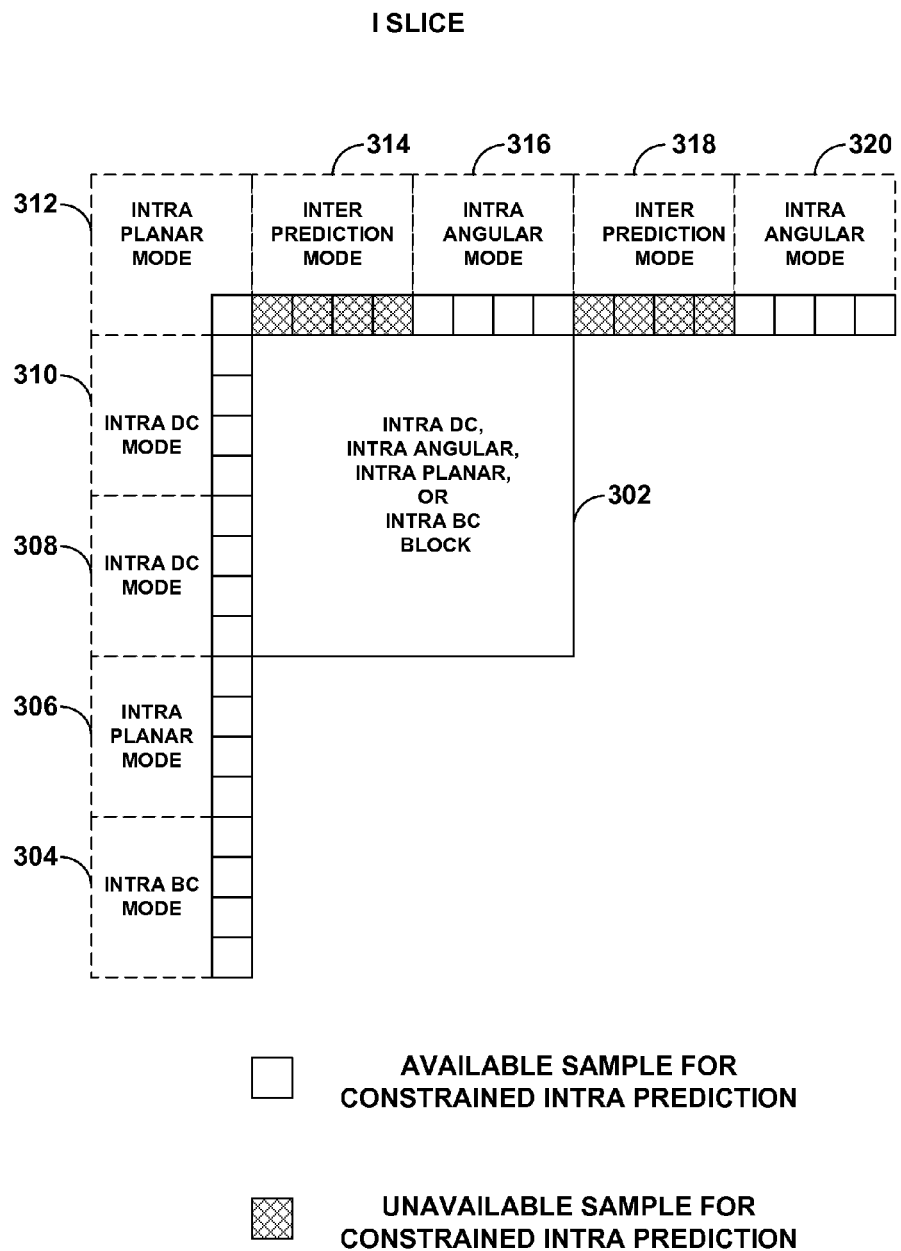
FIG. 4 is a conceptual diagram illustrating available reference blocks for intra prediction modes when using constrained intra prediction in an I slice according to an example technique of this disclosure

For I slices, when constrained intra prediction is enabled, video encoder 20 may be configured to use neighboring reference samples inside a block coded with an intra prediction mode (e.g., one of intra DC, intra Angular, intra BC, or intra Planar mode), and exclude samples from blocks coded with an inter prediction mode. FIG. 4 is a conceptual diagram illustrating available reference blocks for intra prediction modes when using constrained intra prediction in an I slice according to an example technique of this disclosure.

As shown in FIG. 4, for an I slice, current block 302 may be any of an intra DC block, an intra Angular block, an intra Planar block, or an intra BC block. Video encoder 20 may be configured to use neighboring samples from any neighboring block coded with an intra prediction mode, including blocks coded with an intra Planar mode (e.g., blocks 306 and 312), blocks coded with an intra DC mode (e.g., blocks 308 and 310), blocks coded with an intra Angular mode (e.g., blocks 316 and 320), and blocks coded with an intra BC mode (e.g., block 304). Samples from blocks coded with an inter prediction mode (e.g., blocks 314 and 318) may not be used as reference samples to code current block 302 when constrained intra prediction is enabled.

Figure 5:
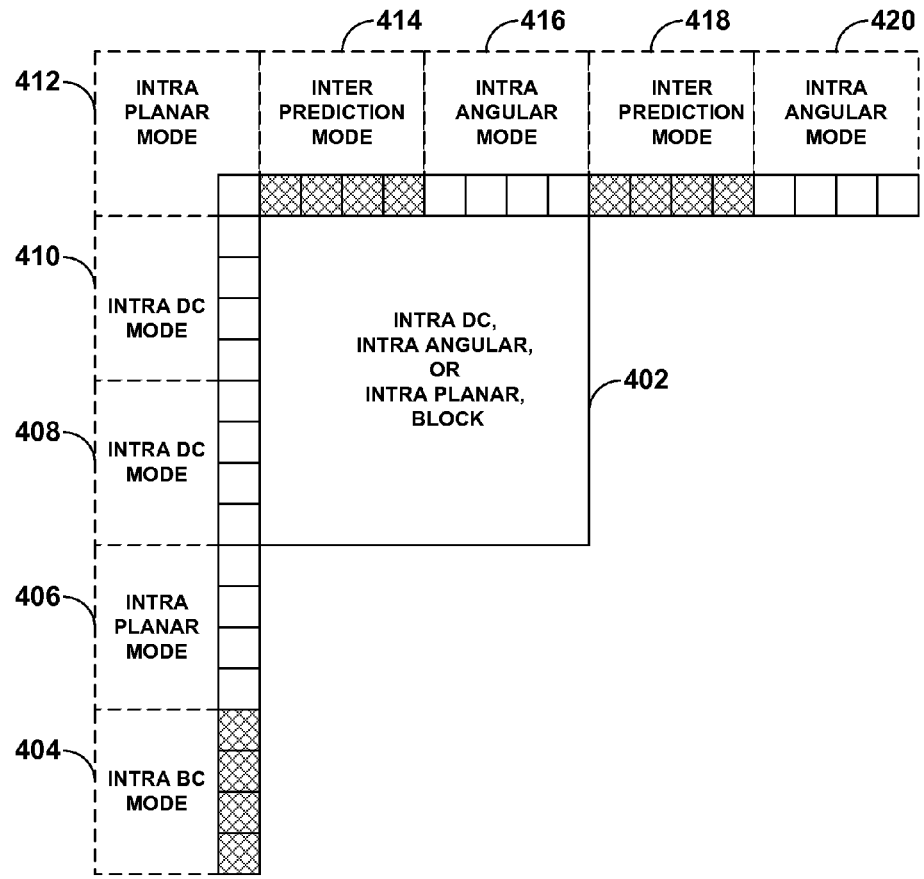
FIG. 5 is a conceptual diagram illustrating available reference blocks for intra prediction modes when using constrained intra prediction in a P/B slice according to an example technique of this disclosure.

For P/B slices, when constrained intra prediction is enabled, only the neighboring reference samples inside the block coded using the original three HEVC intra prediction modes (i.e., intra Angular, intra Planar, and intra DC) are considered to be available to be used as reference samples when coding a current block using one the original three HEVC intra prediction coding modes (i.e., intra Angular, intra Planar, and intra DC). FIG. 5 is a conceptual diagram illustrating available reference blocks for intra prediction modes when using constrained intra prediction in a P/B slice according to an example technique of this disclosure.

As shown in FIG. 5, for a P/B slice, current block 402 may be any of an intra DC block, an intra Angular block, or an intra Planar block. Video encoder 20 may be configured to use neighboring samples from any neighboring block coded with one of the three original HEVC intra prediction modes, including blocks coded with an intra Planar mode (e.g., blocks 406 and 412), blocks coded with an intra DC mode (e.g., blocks 408 and 410), and blocks coded with an intra Angular mode (e.g., blocks 416 and 420). Samples from blocks coded with an inter prediction mode (e.g., blocks 414 and 418) and blocks coded with an intra BC mode (e.g., block 404) may not be used as reference samples to code current block 402 when constrained intra prediction is enabled. Note that this restriction is not valid if the current block 402 is coded with intra BC mode. In other words, in this example for P/B when constrained intra prediction is enabled, the neighboring reference samples inside the block using either intra or inter mode are considered to be available for prediction of current block 402 with intra BC mode.

In another example of the disclosure, when constrained intra prediction is enabled, video encoder 20 may be configured to not use (or mark as unavailable) samples inside the blocks coded with inter prediction modes when coding blocks with an intra BC mode. In one example, samples marked as unavailable may be substituted with the neighboring available reference sample values. In this example, each of the four intra prediction modes (i.e., intra Angular, intra Planar, intra DC, and intra BC) are supported for all kinds of slices.

For I/P/B slices, when constrained intra prediction is enabled, the neighboring reference samples inside the block coded with any of these four intra prediction modes are considered to be available for the intra prediction (any of the four intra modes) of current block. However, when constrained intra prediction is enabled, when any sample in the prediction block for the block coded with intra BC mode is from an inter predicted block, the sample is considered to be unavailable and its value is substituted with the neighboring available reference sample value. The substituted value of the unavailable samples may be obtained using intra Angular, intra Planar, or intra DC intra prediction techniques by referring to the neighboring available reference samples.

Figure 6:
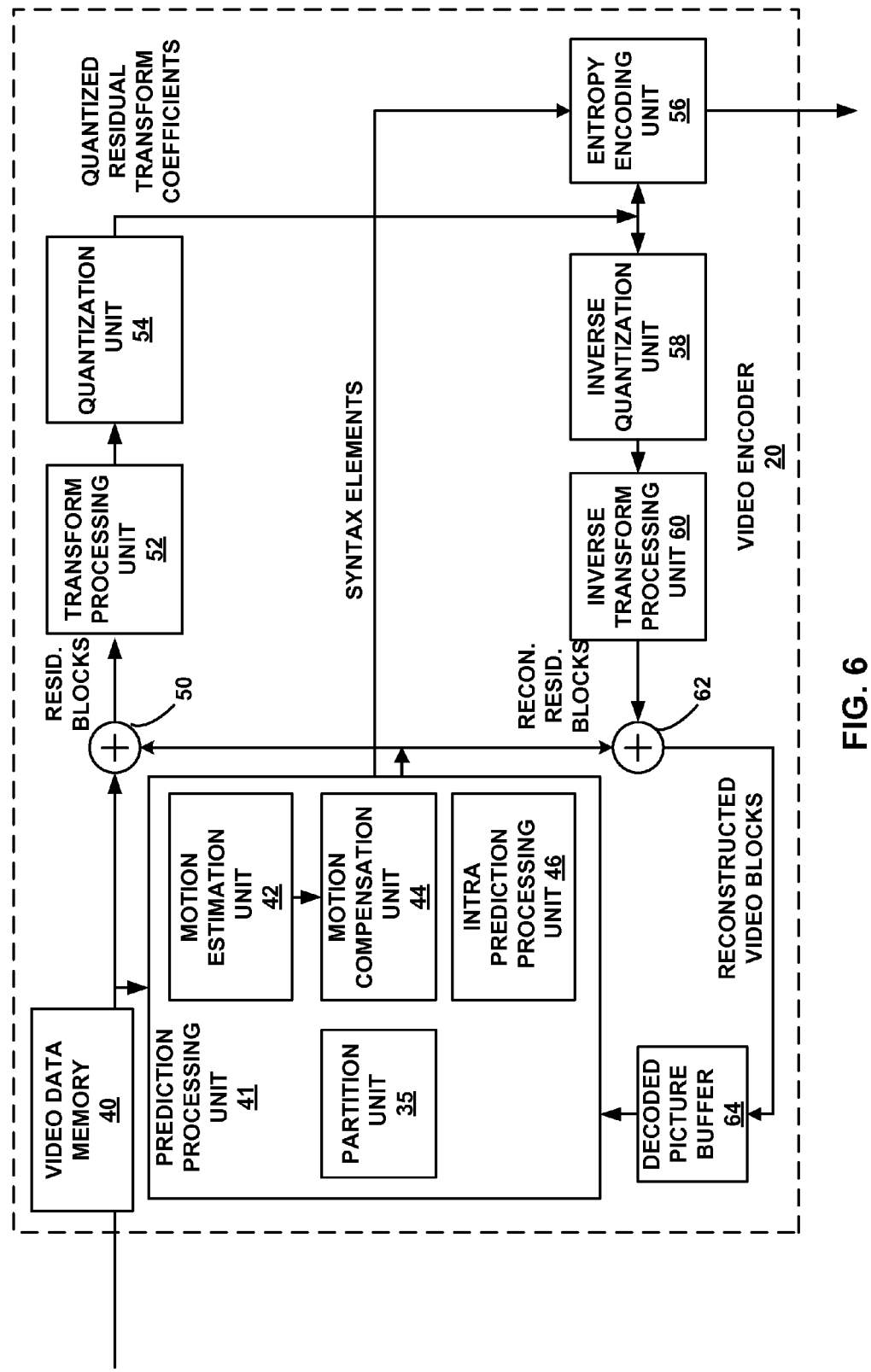
FIG. 6 is a block diagram illustrating an example video encoder that may implement the techniques described in this disclosure.

FIG. 6 is a block diagram illustrating an example video encoder 20 that may implement the constrained intra prediction techniques described in this disclosure. Video encoder 20 may perform intra and inter coding of video blocks within video slices. Intra coding relies on spatial prediction to reduce or remove spatial redundancy in video within a given video frame or picture. Inter coding relies on temporal prediction to reduce or remove temporal redundancy in video within adjacent frames or pictures of a video sequence. Intra mode (I mode) may refer to any of several spatial based compression modes. As discussed above, video encoder 20 may be configured to code video data in one or more of a plurality of intra modes, including an intra DC mode, an intra Angular, mode, an intra Planar mode, and an intra BC mode. Inter modes, such as uni-directional prediction (P mode) or bi-prediction (B mode), may refer to any of several temporal-based compression modes.

In the example of FIG. 6, video encoder 20 includes video data memory 40, prediction processing unit 41, decoded picture buffer 64, summer 50, transform processing unit 52, quantization unit 54, and entropy encoding unit 56. Prediction processing unit 41 includes partition unit 35, motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 6) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Decoded picture buffer (DPB) 64 is a buffer that stores reference video data for use in encoding video data by video encoder 20 (e.g., in intra or inter coding modes, also referred to as intra or inter prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 6, video encoder 20 receives video data, and partition unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may be configured to implement the techniques of this disclosure described above for performing intra prediction, including intra BC intra prediction, when constrained intra prediction is enabled. Prediction processing unit 41 may provide the resulting intra or inter coded block to summer 50 to generate residual block data and to summer 62 to reconstruct the encoded block for use as a reference picture.

Intra prediction processing unit 46 within prediction processing unit 41 may perform intra predictive coding of the current video block relative to one or more neighboring blocks in the same frame or slice as the current block to be coded to provide spatial compression. Motion estimation unit 42 and motion compensation unit 44 within prediction processing unit 41 perform inter predictive coding of the current video block relative to one or more predictive blocks in one or more reference pictures to provide temporal compression.

Motion estimation unit 42 may be configured to determine the inter prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra predict a current block, as an alternative to the inter prediction performed by motion estimation unit 42 and motion compensation unit 44, as described above. In particular, intra prediction processing unit 46 may determine an intra prediction mode, including an Intra BC mode, to use to encode a current block. In some examples, intra prediction processing unit 46 may encode a current block using various intra prediction modes, e.g., during separate encoding passes, and intra prediction processing unit 46 (or a mode select unit, in some examples) may select an appropriate intra prediction mode to use from the tested modes.

For example, intra prediction processing unit 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra prediction mode exhibits the best rate-distortion value for the block.

In accordance with the techniques of this disclosure, as described above, video encoder 20, using one or more structural units of prediction processing unit 41, may be configured to determine that a current block of video data is to be encoded using an intra block copy (BC) mode and constrained intra prediction. Video encoder 20 may be further configured to determine one or more reference blocks that may be used for encoding the current block using the intra BC mode, wherein each of the one or more reference blocks is encoded with an intra prediction mode, and encode the current block of video data using the intra BC mode and at least one of the determined one or more reference blocks.

In any case, after selecting an intra prediction mode for a block, intra prediction processing unit 46 may provide information indicative of the selected intra prediction mode for the block to entropy encoding unit 56. Entropy encoding unit 56 may encode the information indicating the selected intra prediction mode in accordance with the techniques of this disclosure. Video encoder 20 may include in the transmitted bitstream configuration data, which may include a plurality of intra prediction mode index tables and a plurality of modified intra prediction mode index tables (also referred to as codeword mapping tables), definitions of encoding contexts for various blocks, and indications of a most probable intra prediction mode, an intra prediction mode index table, and a modified intra prediction mode index table to use for each of the contexts.

After prediction processing unit 41 generates the predictive block for the current video block via either inter prediction or intra prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter predict a block in a subsequent video frame or picture.

Figure 7:
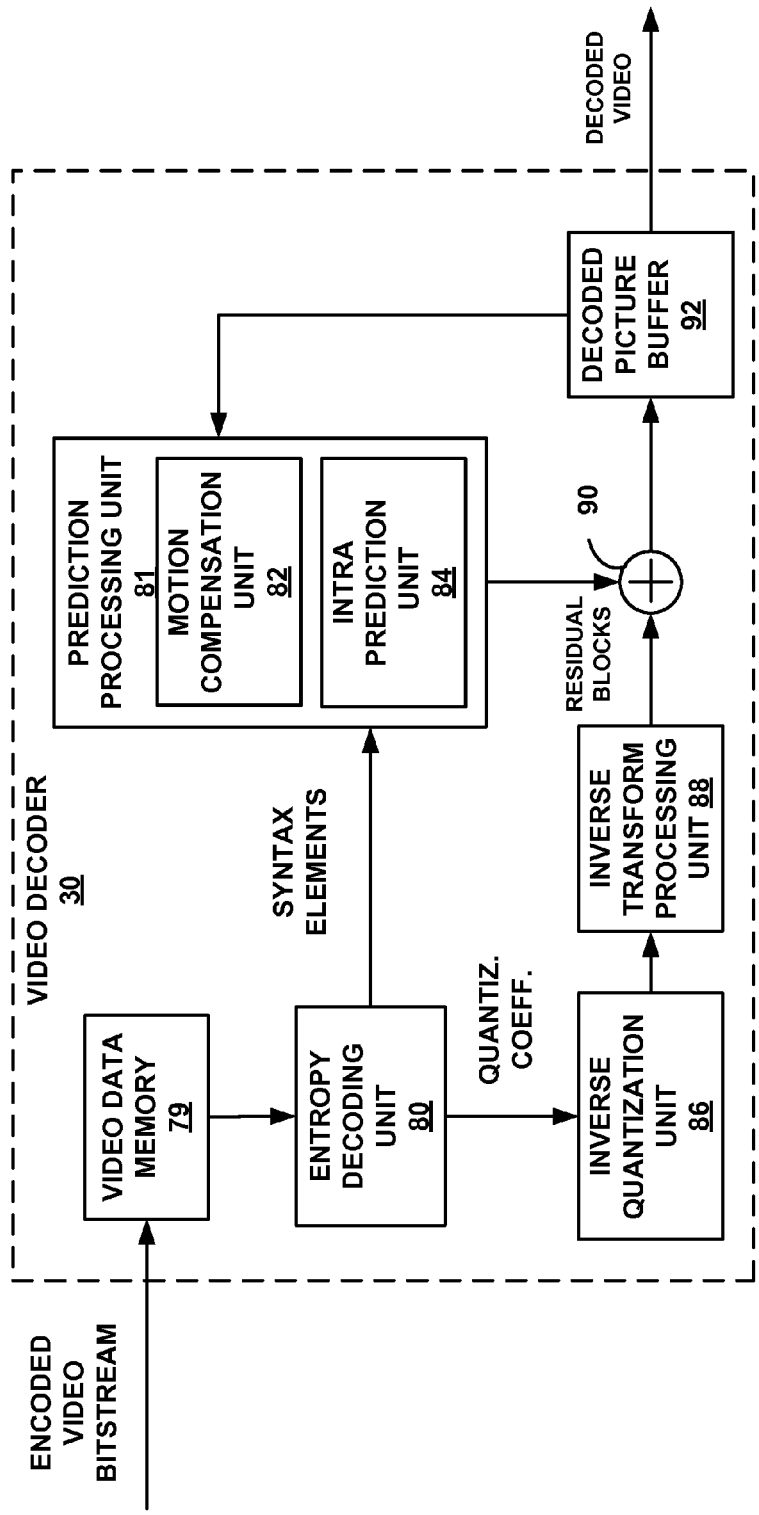
FIG. 7 is a block diagram illustrating an example video decoder that may implement the techniques described in this disclosure.

FIG. 7 is a block diagram illustrating an example video decoder 30 that may implement the techniques for constrained intra prediction described in this disclosure. In the example of FIG. 7, video decoder 30 includes video data memory 79, entropy decoding unit 80, prediction processing unit 81, inverse quantization unit 86, inverse transformation processing unit 88, summer 90, and decoded picture buffer 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 6.

Video data memory 79 may store video data, such as an encoded video bitstream, to be decoded by the components of video decoder 30. The video data stored in video data memory 79 may be obtained, for example, from storage device 32, from a local video source, such as a camera, via wired or wireless network communication of video data, or by accessing physical data storage media. Video data memory 79 may form a coded picture buffer (CPB) that stores encoded video data from an encoded video bitstream. Decoded picture buffer 92 is one example of a decoded picture buffer (DPB) that stores reference video data for use in decoding video data by video decoder 30 (e.g., in intra or inter coding modes, also referred to as intra or inter prediction coding modes). Video data memory 79 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and DPB 92 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra coded (I) slice, intra prediction processing unit 84 of prediction processing unit 81 may generate prediction data for a video block of the current video slice based on a signaled intra prediction mode and data from previously decoded blocks of the current frame or picture. Prediction processing unit 81 may be configured to implement the techniques of this disclosure for performing intra prediction, including intra BC intra prediction, when constrained intra prediction is enabled. When the video frame is coded as an inter coded (i.e., B, or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice or P slice), construction information for one or more of the reference picture lists for the slice, motion vectors for each inter encoded video block of the slice, inter prediction status for each inter coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 92, which stores reference pictures used for subsequent motion compensation. Decoded picture buffer 92 also stores decoded video for later presentation on a display device, such as display device 34 of FIG. 1.

Figure 8:
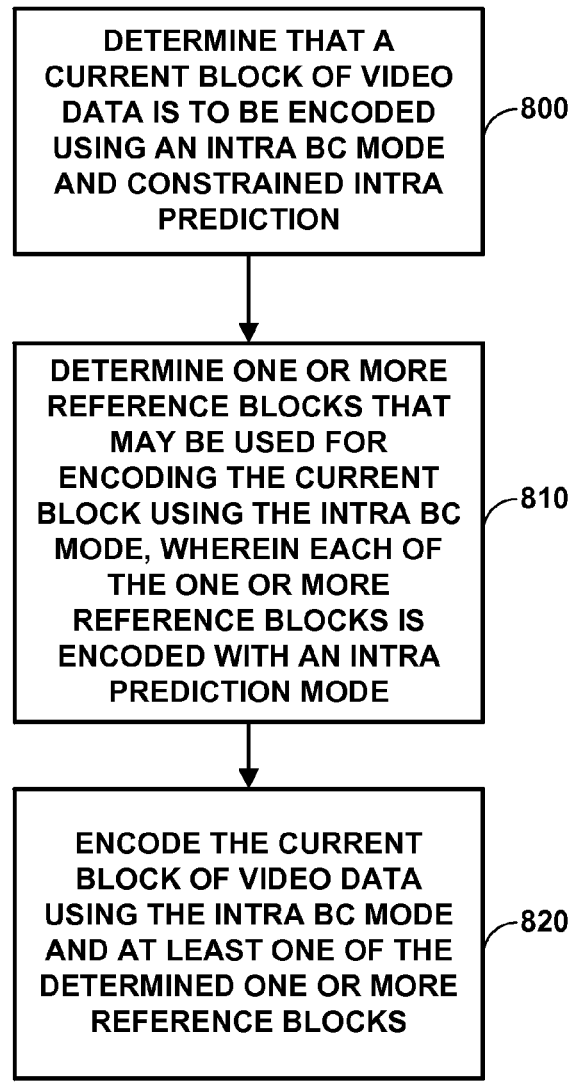
FIG. 8 is a flowchart illustrating an example method of the disclosure.

FIG. 8 is a flowchart illustrating an example encoding process according to the techniques of the disclosure. The techniques of FIG. 8 may be implemented by one or more structural units of video encoder 20, including prediction processing unit 41.

In one example of the disclosure, video encoder 20 may be configured to determine that a current block of video data is to be encoded using an intra block copy (BC) mode and constrained intra prediction (800). Video encoder 20 may be further configured to determine one or more reference blocks that may be used for encoding the current block using the intra BC mode, wherein each of the one or more reference blocks is encoded with an intra prediction mode (810), and encode the current block of video data using the intra BC mode and at least one of the determined one or more reference blocks (820). In one example of the disclosure, video encoder 20 may be configured to determine the one or more reference blocks by excluding blocks of video data encoded using an inter prediction mode from the one or more reference blocks.

In one example of the disclosure, the intra prediction mode comprises one or more of the intra BC mode, an intra Angular mode, an intra Planar mode, or an intra DC mode, and the current block of video data is in any of an I slice, a P slice, or a B slice.

In another example of the disclosure, video encoder 20 may be further configured to determine a particular reference block of the one or more reference blocks to be used as a predictive block for the current block of video data, wherein encoding the current block of video data using the intra BC mode comprises predicting the current block of video data from the predictive block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    determining that a current block of video data of a P slice or a B slice is to be encoded using constrained intra prediction;
    determining a reference sample is available for encoding the current block based on the reference sample being inside a block that is intra Angular mode-coded, intra Planar mode-coded, or intra DC mode-coded, wherein determining the reference sample is available comprises excluding any samples inside any blocks that are inter prediction mode-coded without substituting any excluded samples; and
    encoding the current block of video data using the reference sample determined to be available.

2. An apparatus configured to encode video data, the apparatus comprising:
    a video memory configured to store information related to a current block and one or more reference samples; and
    a video encoder configured to:
        determine that the current block of video data of a P slice or a B slice is to be encoded using constrained intra prediction;
        determine a reference sample of the one or more reference samples is available for encoding the current block based on the reference sample being inside a block that is intra Angular mode-coded, intra Planar mode-coded, or intra DC mode-coded, wherein the video encoder is configured to determine the reference sample of the one or more reference samples is available by being configured to exclude any samples inside any blocks that are inter prediction mode-coded without substituting any excluded samples; and
        encode the current block of video data using the reference sample determined to be available.

3. The apparatus of claim 2, further comprising at least one of a desktop computer, a laptop computer, a smartphone, a tablet computer, a television, a set-top box, a video gaming console, or a digital media player.

4. The apparatus of claim 2, further comprising a transmitter in communication with the video encoder and configured to transmit the encoded current block in an encoded video bitstream over a communication channel.

5. An apparatus configured to encode video data, the apparatus comprising:
    means for determining that a current block of video data of a P slice or a B slice is to be encoded using constrained intra prediction;
    means for determining a reference sample is available for encoding the current block based on the reference sample being inside a block that is intra Angular mode-coded, intra Planar mode-coded, or intra DC mode-coded, wherein means for determining the reference sample is available comprises means for excluding any samples inside any blocks that are inter prediction mode-coded without substituting any excluded samples; and
    means for encoding the current block of video data using the reference sample determined to be available.

6. A non-transitory computer-readable storage medium having instructions stored thereon that, when executed, cause one or more processors of a device configured to encode video data to:
    determine that a current block of video data of a P slice or a B slice is to be encoded using constrained intra prediction;
    determine a reference sample is available for encoding the current block based on the reference sample being inside a block that is intra Angular mode-coded, intra Planar mode-coded, or intra DC mode-coded, wherein the instructions that, when executed, cause the one or more processors to determine the reference sample is available further cause, when executed, the one or more processors to exclude any samples inside any blocks that are inter prediction mode-coded without substituting any excluded samples; and
    encode the current block of video data using the reference sample determined to be available.

* * * * *